US012739558B2

(12) United States Patent
Price et al.

(10) Patent No.: US 12,739,558 B2
(45) Date of Patent: Sep. 15, 2026

(54) FORCE-CANCELLING, ISOBARIC AUDIO SYSTEM WITH CONFIGURABLE BASS AND PRIVACY MODES

(71) Applicant: Meta Platforms Technologies, LLC, Menlo Park, CA (US)

(72) Inventors: Rex Pinegar Price, Cameron Park, CA (US); Daniel Warren, Nashville, TN (US); Chuming Zhao, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 121 days.

(21) Appl. No.: 18/930,944

(22) Filed: Oct. 29, 2024

(65) Prior Publication Data

US 2025/0056151 A1 Feb. 13, 2025

Related U.S. Application Data

(62) Division of application No. 17/893,059, filed on Aug. 22, 2022, now Pat. No. 12,160,703.

(51) Int. Cl.

*H04R 1/28* (2006.01)
*H04R 1/10* (2026.01)
*H04R 3/00* (2006.01)

(52) U.S. Cl.

CPC ......... *H04R 1/2803* (2013.01); *H04R 1/1041* (2013.01); *H04R 3/00* (2013.01)

(58) Field of Classification Search

CPC ........ A61F 2002/068; A61F 2230/0091; A61F 2240/001; A61F 2250/0001; A61F 5/0123; A61F 9/068; H04R 2499/11; H04R 1/025; H04R 1/2811; H04R 1/2826; H04R 5/02; H04R 1/028; H04R 1/345; H04R 9/06; H04R 3/002; H04R 3/00; H04R 1/26;

(Continued)

(56) References Cited

U.S. PATENT DOCUMENTS 12,160,703 B1 * 12/2024 Price .................... H04R 1/1041
2012/0250909 A1 * 10/2012 Grosh .................... H10N 30/05 381/174

(Continued)

OTHER PUBLICATIONS

Notice of Allowance mailed Jul. 31, 2024 for U.S. Appl. No. 17/893,059, filed Aug. 22, 2022, 12 pages.

*Primary Examiner* — Lun-See Lao
(74) *Attorney, Agent, or Firm* — Greenberg Traurig, LLP

(57) ABSTRACT

An audio system comprises a plurality of membranes within an enclosure. A first surface of each membrane is part of a shared back volume within the enclosure and pressure within the shared back volume is configured to be isobaric. A second surface of each membrane is part of a front volume within the enclosure that includes a plurality of ports. A controller of the audio system is configured to drive the plurality of membranes. In a mode of operation, the controller is configured to match audio output between the plurality of ports, forming pressure waves of equal amplitude and opposite phase and generating a substantially dipole or linear quadrupole sound wave radiation pattern for frequencies above a predefined threshold and mismatch audio output between the plurality of ports for frequencies at or below the predefined threshold to generate a substantially monopole or cardioid sound wave radiation pattern.

20 Claims, 10 Drawing Sheets

800

(58) Field of Classification Search

CPC ..................... H04R 2201/028; H04R 2499/15; H04R 1/02; H04R 1/288; H04R 1/2857; H04R 2205/022; H04R 3/007; H04R 1/2834; H04R 1/30; H04S 2400/09; H04S 7/304; H04S 3/00; H04S 1/007; H04S 2400/11; H04S 2400/15; H04S 2420/01; G10K 2210/1282; G10K 2210/106; G10K 2210/1291; G10K 11/17881

USPC .................................................... 381/74, 312

See application file for complete search history.

(56) References Cited

U.S. PATENT DOCUMENTS

| | | | | |
|---|---|---|---|---|
| 2013/0083630 | A1* | 4/2013 | Onishi | H04R 17/00<br>310/322 |
| 2015/0358708 | A1* | 12/2015 | Axelsson | H04R 1/08<br>381/71.7 |
| 2019/0017893 | A1* | 1/2019 | Tumpold | G01L 27/005 |
| 2019/0356974 | A1 | 11/2019 | Loeppert et al. | |
| 2020/0304922 | A1 | 9/2020 | Brioschi et al. | |
| 2020/0400553 | A1 | 12/2020 | Manz et al. | |
| 2022/0103934 | A1 | 3/2022 | Ilkorur et al. | |
| 2023/0022584 | A1 | 1/2023 | Kelly | |
| 2023/0262370 | A1 | 8/2023 | Minervini et al. | |

* cited by examiner

800

FORCE-CANCELLING, ISOBARIC AUDIO SYSTEM WITH CONFIGURABLE BASS AND PRIVACY MODES

CROSS-REFERENCE TO RELATED APPLICATIONS

This application is a divisional of U.S. Non-Provisional application Ser. No. 17/893,059, filed Aug. 22, 2022, entitled "FORCE-CANCELLING, ISOBARIC AUDIO SYSTEM WITH CONFIGURABLE BASS AND PRIVACY MODES," the disclosure of which is incorporated by reference herein in its entirety for all purposes.

FIELD OF THE INVENTION

This disclosure relates generally to artificial reality systems, and more specifically to force cancelling, isobaric audio system with configurable bass and privacy modes.

BACKGROUND

When a speaker is mounted on a wearable device, such as AR glasses or VR headset, it may generate vibration to the whole device, causing unwanted shaking and contamination to signals. For example, an inertial measurement unit (IMU) is required for proper tracking of body and head motion of the wearer during AR/VR use, and contamination of IMU signals will result in inaccurate measurements that are difficult to correct. Audio leakage from a wearable device may also be undesirable, as a wearer may wish to maintain privacy. Existing speakers that are manufactured for better bass performance have increased shaking and increased leakage that is unsuitable for many wearable device applications.

SUMMARY

Embodiments described herein provide a force-cancelling audio system utilizing speakers with a shared isobaric back volume. The speakers move in opposing directions to cancel force that would otherwise be transmitted into the enclosure. As one speaker moves into the enclosure, increasing the pressure inside the back volume, the other speaker(s) moves out of the enclosure, reducing the pressure inside the back volume and offsetting the pressure change. The isobaric back volume also enables the audio system to include matched front waveguides for dipole or linear quadrupole sound wave radiation patterns. Ideal matching of the output between ports can enable the dipole or linear quadrupole to function appropriately at much higher frequencies than without perfect matching between the ports. This can result in reduced audio leakage from the device with better privacy performance. The isobaric configuration can also allow for a deliberate mismatch between speakers to enable different polar patterns and cardioid shading by reducing the output at a port relative to the other ports. By turning down the audio output at the port, a cardioid or monopole-like polar pattern can be produced. This can result in reduced low frequency cancellation and improved bass performance.

An audio system comprises a plurality of membranes within an enclosure. A first surface of each of the plurality of membranes is part of a shared back volume within the enclosure and pressure within the shared back volume is configured to be substantially isobaric. A second surface of each of the plurality of membranes is part of a front volume within the enclosure that includes a plurality of ports. A controller of the audio system is configured to drive the plurality of membranes. In at least one mode of operation, the controller is configured to match audio output (i.e., generating pressure waves of equal amplitude and opposite phase) between the plurality of ports to generate a substantially dipole or linear quadrupole sound wave radiation pattern for frequencies above a predefined threshold, and, for frequencies at or below the predefined threshold, mismatch audio output between the plurality of ports to generate a substantially monopole or cardioid sound wave radiation pattern.

A method for providing audio output, in accordance with one or more embodiments, comprises determining a first mode of operation and generating first mode input signals for voice coils that drive a plurality of membranes based at least in part on the determined first mode of operation. A first surface of each of the plurality of membranes is part of a shared back volume within an enclosure, and a second surface of each of the plurality of membranes is part of a front volume within the enclosure that includes a plurality of ports. Pressure within the shared back volume is substantially isobaric. The method further comprises providing a driving current through the voice coils in accordance with the first mode input signals, such that the plurality of membranes generates sound that is output from the plurality of ports to form a first sound wave radiation pattern of a plurality of predetermined sound wave radiation patterns that are associated with different modes of operation. In one embodiment, the output of the plurality of membranes are matched. In one embodiment, in a two membrane (two speaker), two-port dipole design, both membranes are driven by a single amplifier. This may result in force cancellation, ideal port matching for improved dipole performance, and the benefits of the isobaric shared back volume.

A non-transitory computer-readable storage medium comprising stored instructions. The instructions, when executed by a processor of a device, cause the device to determine a first mode of operation and generate first mode input signals for voice coils that drive a plurality of membranes based in part on the determined first mode of operation. A first surface of each of the plurality of membranes is part of a shared back volume within an enclosure, and a second surface of each of the plurality of membranes is part of a front volume within the enclosure that includes a plurality of ports. Pressure within the shared back volume is substantially isobaric. The instructions, when executed, further cause the device to provide a driving current through the voice coils in accordance with the first mode input signals, such that the plurality of membranes generates sound that is output from the plurality of ports to form a first sound wave radiation pattern of a plurality of predetermined sound wave radiation patterns that are associated with different modes of operation.

Figure 1:
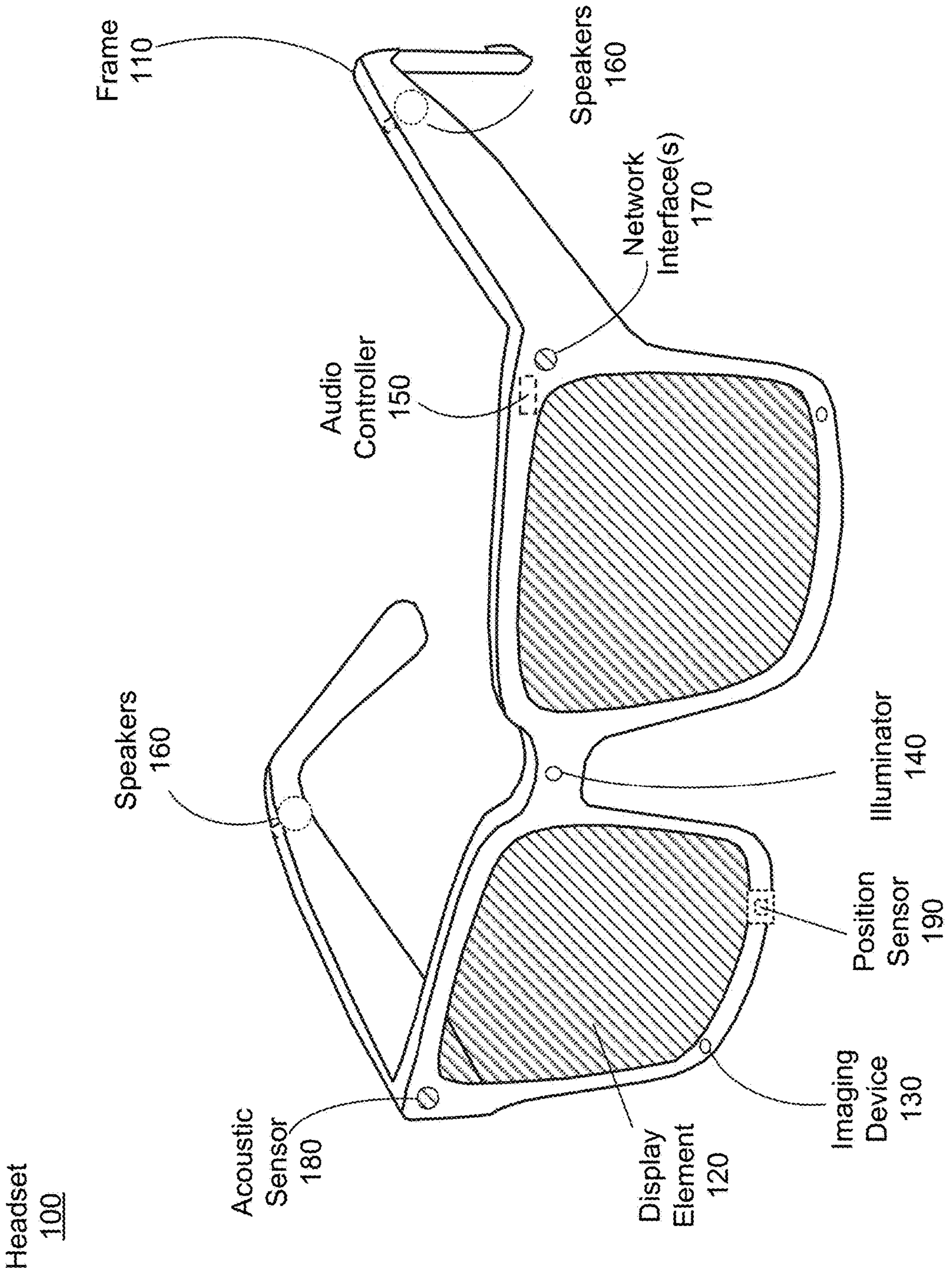
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A speaker generates sound through the vibration of the diaphragm. When the speaker is mounted on a wearable device such as a VR headset or AR glasses, it may generate vibrations of the wearable device that are detected by an inertial measurement unit (IMU) of the wearable device. These detected vibrations (also referred to as contamination signals) may cause motion tracking to fail. These contamination signals can be as high as about 180 mgee-rms on x acceleration and 4 deg/second-rms on y gyroscope in the audio-band. Motion tracking failure may usually happen at 60-130 Hz, which is much higher than usual body/head motion, which are usually less than 50 Hz. These contamination signals cannot be easily eliminated by purely algorithmic processing due to nonlinear, non-quantified gyroscope response to audio-band vibrations. There are some mitigation approaches, such as: (1) adding a high pass filter to the speakers; or (2) adding a peaking filter on the IMU. However, approach 1 sacrifices the speaker bass performance and approach 2 can introduce a 4 ms delay that causes swim/drift issues for head tracking.

Described herein is a force-canceling speaker architecture utilizing side-by-side (or side-by-side-by-side) speakers with a shared isobaric back volume. The speakers move in opposite directions to substantially cancel the force that would otherwise be transmitted into the enclosure. As one speaker moves into the enclosure, increasing the pressure inside the back volume, the other speaker moves out of the enclosure, reducing the pressure inside the back volume and offsetting the pressure change that would have resulted from the other speaker's motion inside of the enclosure. With the isobaric approach, the pressure inside the back volume remains constant. The isobaric back volume acts like an infinite baffle when the speakers operate as a force canceling pair. This approach enables the use of a small sealed back volume that does not introduce considerable stiffness that would otherwise compromise a small, sealed box loudspeaker design.

The isobaric back volume also enables the design to include matched front waveguides for dipole configuration. Ideal matching of the output at the front and rear ports (or bottom and top ports respectively) enables the dipole configuration to function appropriately at much higher frequencies than a single speaker dipole design which may not easily achieve perfect matching between the front and rear ports. The configuration results in reduced audio leakage from the device with better privacy performance.

The isobaric sealed back volume reduces the system complexity and assembly process considerably. The sealed back volume reduces the number of visible ports on the outside of the device and eliminates the risk of water intrusion. Furthermore, the sealed back volume eliminates the need for a resistive mesh placed over the rear port of a single speaker dipole design. Resistive meshes can create an overdamped system, resulting in the loss of output at low frequencies compared to the current isobaric dipole configuration. The simplified construction also may enable a taller and wider driver by eliminating additional lids or sealing structures.

The isobaric dipole configuration allows for a deliberate mismatch between the speakers to enable different polar patterns through cardioid shading by reducing the output at the rear port relative to the front port. By turning down the output at the rear port, a cardioid or monopole-like polar pattern can be produced. This results in reduced low frequency cancellation compared to a traditional dipole configuration. Reducing the power delivered to the rear speaker may trade away some force cancellation in exchange for additional low frequency output. As such, a speaker system that is uniquely capable of producing greater low frequency output by turning down input voltage is provided. With an appropriate filter, the isobaric dipole configuration can transition from a monopole-like or cardioid polar pattern at low frequencies for improved bass performance to a dipole (or linear quadrupole) at high frequencies for better privacy performance.

The isobaric dipole can be configured with two ports and two speakers in a side-by-side configuration. A system that can achieve a linear quadrupole polar pattern at high frequencies may comprise three ports and two speakers (two membranes). The front waveguide for one of the two speakers may be split between the top and bottom ports, with the front waveguide for the second speaker connected to the middle/center port. The linear quadrupole pattern can also be achieved with three ports and three speakers in a side-by-side-by-side configuration.

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the car of the user (e.g., temple tip, earpiece). The frame 110 acts as an enclosure that holds various components of an audio system. As such, reference to an "enclosure" or "headset enclosure" may refer to at least a portion of the frame 110 where components of the audio system may be enclosed, and namely, where audio ports of a speaker module may be situated.

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of a user occupies while wearing the headset 100. For example, a display element 120 may be a waveguide display. A waveguide display includes a light source (e.g., a two-dimensional source, one or more line sources, one or more point sources, etc.) and one or more optical waveguides. Light from the light source is in-coupled into the one or more optical waveguides which outputs the light in a manner such that there is pupil replication in an eyebox of the headset 100. In-coupling and/or outcoupling of light from the one or more optical waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1 shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

The network interface(s) provide network connectivity with one or more networks. For example, the network interfaces may include communication interfaces for wirelessly connecting over Wifi, Bluetooth, cellular network, other communication network, or some combination thereof. In embodiments, the network interface(s) may enable voice calls when operating in a "call mode," such as through direct connectivity to the network or though network connection to a call-making device (e.g., smartphone).

The audio system provides audio content. The audio system includes a speaker module, and an audio controller 150. Optionally, in one embodiment, the audio system may further comprise a sensor array. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The speaker module presents sound to a user. The speaker module includes a plurality of speakers. The speaker module may include speakers 160. The speakers 160 may be enclosed in the frame 110. In embodiments, instead of individual speakers for each car, the headset 100 includes a speaker array comprising multiple speakers integrated into the frame 110 to improve performance and directionality of presented audio content. The number and/or locations of the speakers of speaker modules may be different from what is shown in FIG. 1.

For purposes of describing the embodiments herein, reference to the configuration and function of speakers 160 may refer to either of the speakers 160 as disposed on the left portion of the frame of headset 100 or as disposed on the right portion of the frame. It is noted that the configuration of the speakers 160 may be substantially identical on the left and right portions of the frame, except mirrored, so as to direct audio output towards the direction of the wearer's ears. Furthermore, reference to the "audio system" of headset 100 may refer to the speakers 160 and corresponding ports, and additionally includes audio controller 150 configured to drive the speakers 160 and control audio output provided at the corresponding ports.

In embodiments, situated at speakers 160, the audio system of headset 100 may comprise a first port configured to provide sound waves from the speakers 160 in a first outward direction from the headset enclosure (i.e., outward from frame 110) and towards an car of a wearer, and a second port configured to provide sound waves from the speakers 160 in a second outward direction from the headset enclosure and towards the car of the wearer. The first outward direction and second outward direction may be opposing/opposite directions relative to the headset enclosure. For example, the first port may be situated on the bottom portion of the frame 110, directly above the cars of the wearer (e.g., above the car canal and near the ear lobes) and directing sound downwards towards the wearer, while the second port may be situated on the top portion of the frame 110, directing sound upwards towards the wearer. The first port and second port are spaced across the headset enclosure along an axis of these directions, such that a substantially null plane is created along a middle axis of the headset enclosure when audio output between the first port and the second port is matched. By matching audio output between these opposing directions across the headset enclosure, a null plane is created in the outward direction from the frame 110, thereby reducing any audio in the direction away from the wearer that may "leak" into the environment and be heard by others. As such, the wearer of headset 100 can maintain privacy when listening to audio output from speakers 160.

In one embodiment, the first port situated on the bottom portion of the frame 110 may be positioned slightly more forward, towards the front of the headset in the direction of the display element 120, while the second port situated on the top portion of the frame 110 may be positioned slightly more backward, towards the rear of the headset and away from the display element 120. As such, the first and second port may sometimes be referred to herein as the "front port" and "rear port" respectively. The audio output may be matched between the front and rear port, thereby creating a null plane in the outward direction from the wearer of headset 100. An advantage of the embodiments described herein is that matching audio output between ports (e.g., top and bottom, front and rear) may be achieved more easily through the side-by-side, force-cancelling, isobaric speaker configuration than in other speaker configurations. Additional details regarding the configuration and audio output at the front and rear ports are provided with respect to the description of FIGS. 3A, 3B, and 3C further below.

In one embodiment, situated at speakers 160, the audio system of the headset may comprise three ports, including a center port configured to provide sound waves from the speakers 160 outwards from the enclosure and directly towards the wearer of headset 100, as well as the top port and bottom port (rear and front ports respectively) configured to provide the sound waves outwards from the enclosure and towards the wearer through a top and bottom of the enclosure respectively. The center port may be situated between the first and second ports. For example, the center port may be situated below the top port and above the bottom port. The center port may be situated in front of the rear port, in the direction towards the display element 120, and behind the front port, in the direction away from the display element 120. Additional details regarding the positioning of the ports and speakers in three port configurations are provided with respect to the descriptions of FIG. 4 and FIG. 5A, further below.

In one embodiment, the center port is spaced substantially equidistant from the top port and bottom port across the enclosure, such that sound wave radiation behind the center port and away from the listener is substantially null when the audio output between the center port and the top and bottom ports is matched. For example, when a dipole sound wave radiation pattern is formed between the top and bottom port (or rear and front ports respectively), a null plane is created at the center of the enclosure, and sound in the outward direction from the outer portion of the headset frame 110 behind the center port is reduced, thereby preventing additional sound leakage to the outside environment of the wearer of headset 100. The sound from the top, bottom, and center ports may form a linear quadrupole sound wave radiation pattern.

The speakers 160 comprise a plurality of membranes. Each speaker includes a membrane/diaphragm attached to a voice coil (e.g., magnetic voice coil) that converts electrical energy into the linear movement of the membrane, producing pressure and vibration that propagates through a medium (e.g., air) and is perceived as sound, i.e., sound waves. The plurality of membranes of speakers 160 may comprise a first membrane and a second membrane (i.e., two speakers). In one embodiment, the second membrane is disposed along a bend of the headset enclosure, such that a match in power output between the first membrane and the second membrane results in the match in audio output between the center port and the top and bottom ports. An enclosure wall or seal disposed between the first membrane and second membrane prevents audio from the first membrane from leaking out of the center port and audio from the second membrane from leaking out of the top and bottom ports. Additional details regarding this configuration are provided with respect to the description of FIG. 4, further below.

In one embodiment, the plurality of membranes of speakers 160 comprise three membranes (i.e., three speakers), including a first membrane situated near the top port, a second membrane situated near the bottom port, and a third membrane situated near the center port. In the embodiment, the first membrane, second membrane, and third membrane are disposed along a middle axis of the enclosure in a coaxial arrangement, such that a match in power output between the first membrane, the second membrane, and the third membrane results in the match in audio output between the center port and the top and bottom ports. In one embodiment, the size of first membrane, second membrane, and third membrane may be substantially the same, and power output may be matched at all three ports. To achieve ideal force cancellation and a linear quadrupole soundwave radiation pattern, the first membrane and second membrane may be configured to output audio at half of the power of the third membrane. In one embodiment, the first membrane and second membrane are smaller than the third membrane, and the voltage at the first membrane and second membrane provides improved force cancellation at low frequencies, with linear quadrupole soundwave radiation patterns emitted at high frequencies. In such an embodiment, the top port and bottom port may have about half of the acoustic source strength or volume velocity compared to the center port. Additionally details regarding this configuration are provided with respect to the description of FIGS. 5A and 5B, further below.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an car canal of each car (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information to control the functions of the audio system. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

Audio controller 150 processes information to controllably drive the plurality of membranes in different modes of operation. In at least one mode of operation, the audio controller 150 is configured to match audio output between the ports of speakers 160 (i.e., match amplitude of the sound waves radiating from the ports) to generate a substantially dipole or linear quadrupole sound wave radiation pattern at high frequencies and to mismatch audio output between the ports of speakers 160 to generate a substantially monopole or cardioid sound wave radiation pattern. The mode of operation may be a mode where bass performance is prioritized over privacy, such as a game mode or media playback mode.

In embodiments, the different modes of operation may each be associated with a set of predetermined sound wave radiation patterns that are to be generated while operating in the mode, as well as different threshold frequencies for when mismatch between ports may be triggered. For example, when operating in a game mode or movie mode in which shaking of the headset at ultra-low frequencies may be acceptable or act to enhance the experience of the wearer (e.g., during scenes containing explosions), the bass frequency threshold may be set to a lower threshold with a large mismatch between ports. When operating in a music mode, where clarity of bass may be prioritized, the bass frequency threshold may be set to a higher threshold with a smaller mismatch between ports. When operating in a call mode, where privacy is prioritized, the audio controller 150 may be configured to match audio output between ports at all frequencies or configured to generate a very low mismatch between ports when at or below the bass frequency threshold.

In embodiments, matching audio output between ports of the enclosure is achieved in the force-cancelling, isobaric configuration by matching the power and electrical current driven to each membrane of speakers 160. As one of the membranes moves into the enclosure where the audio ports are disposed, the other membrane(s) move out of the enclosure and into a shared back volume, thereby achieving a dipole radiation pattern across the ports where the audio at each port flips back and forth between positive and negative phase. Meanwhile, the mismatching of audio output between ports at bass frequencies can be achieved by reducing power output at one of the membranes of speakers 160 when at or below the bass frequency threshold. As one membrane is driven with less current and radiates a smaller sound wave through its corresponding port, fewer bass frequencies are cancelled out from the opposing phases between the ports of the speaker module, and a cardioid radiation pattern is formed. Additional details regarding mismatching audio output between ports for two speaker (two membrane), three port configurations and three speaker (three membrane), three port configurations are discuss below in connection with FIG. 4 and FIG. 5A respectively. Additional details regarding the components of the headset 100 are discussed below in connection with FIG. 7.

Figure 2:
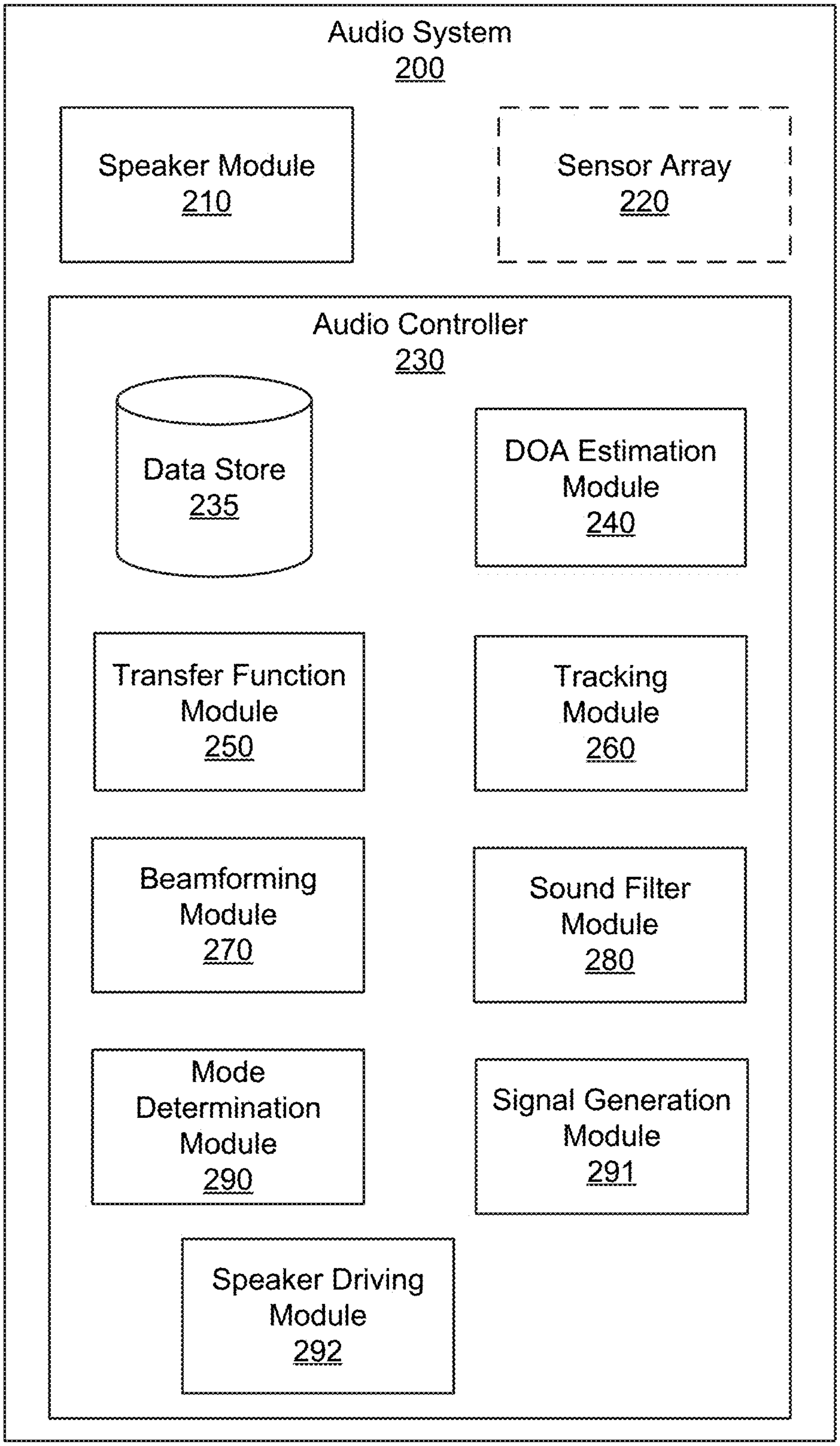
FIG. 2 is a block diagram of an audio system, in accordance with one or more embodiments.

FIG. 2 is a block diagram of an audio system 200, in accordance with one or more embodiments. The audio system in FIG. 1 may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a speaker module 210, and an audio controller 230. In one embodiment, the audio system 200 optionally includes a sensory array 220. Some embodiments of the audio system 200 have different components than those described here. Similarly, in some cases, functions can be distributed among the components in a different manner than is described here.

The speaker module 210 is configured to present audio content. The speaker module 210 includes a plurality of speakers (e.g., speakers 160). The speaker module 210 may present audio content via air conduction via the speakers. In some embodiments, the speaker module 210 may additionally include one or more specialized loudspeakers to cover different parts of a frequency range. For example, a tweeter may be used to produce high audio frequencies, while a woofer may be used to produce low audio frequencies.

The speaker module 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The speaker module 210 may be coupled to a wearable device (e.g., the headset 100 or the headset 105). In alternate embodiments, the speaker module 210 may additionally include a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an car canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the speaker module 210 using at least some of the plurality of acoustic sensors. Increasing the number of sensors may improve the accuracy of information (e.g., directionality) describing a sound field produced by the speaker module 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, sound filter module 280, a mode determination module 290, a signal generation module 291, and a speaker driving module 292. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more speakers of the speaker module 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an car receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the speaker module 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 7).

The sound filter module 280 provides the sound filters to the speaker module 210. In some embodiments, the sound filters may cause positive or negative amplification of sounds as a function of frequency.

The mode determination module 290 determines a current mode of operation of the audio system 200. For example, a first mode of operation of the audio system 200 may be a privacy mode that can be activated by the user or that can be automatically initiated by the audio controller 230 based on the type of audio that is being executed (e.g., voice audio) or based on the type of application that is running/executing the audio (e.g., phone application, video conference application, etc.). As another example, a second mode of operation may be a bass mode or a mode of operation in which bass frequencies may be prioritized over reducing audio leakage (at least in certain instances or at least for certain frequencies). The second mode of operation may be a bass mode that can be activated by a user or automatically initiated by the audio controller 230 based on the type of audio that is being executed (e.g., music, game, movie, or other media content) or based on the type of application that is running/executing the audio (e.g., a music application, movie application, audio/video streaming application, video game application, etc.).

The signal generation module 291 generates audio signals for input to voice coils. The audio signals may contain waveforms, and when the audio signals are provided to the voice coils, the electrical energy drives the motion of the speaker membranes to which they are wired and according to the contained waveforms. The input signals may be generated based on the mode of operation determined by the mode determination module 290. The input signals for each mode of operation may be such that the sound generated from the speaker membranes form predetermined sound wave radiation patterns when output from corresponding audio ports. Depending on the mode of operation, the audio frequencies for output, the number of audio ports, the location of the audio ports, and/or the number and configuration of the speaker membranes, a different sound wave radiation pattern may be targeted for output. For a two-port configuration operating in a privacy mode or that is outputting high frequencies in a bass mode, a dipole sound wave radiation pattern may be targeted. For a three-port configuration operating in a privacy mode or that is outputting high frequencies in a bass mode, a linear quadrupole sound wave radiation pattern may be targeted. Meanwhile, when operating in a bass mode and outputting bass frequencies, a monopole-like or cardioid sound wave radiation pattern may be targeted.

The speaker driving module 292 provides driving currents to the speaker membranes for producing sound. The driving currents may be provided in accordance with the input signals generated by the signal generation module 291 and according to the mode of operation determined by mode determination module 290. This may include providing equally amplified signals across all the voice coils of speaker module 210 when the audio system 200 is operating in a privacy mode or when the audio system 200 is outputting high frequencies in a bass mode. In one embodiment, in a three membrane (three speaker) configuration, all three speakers are the same size, and to achieve ideal force cancellation and a linear quadrupole soundwave pattern, a first and second membrane (e.g., outer speakers) may have ½ the output of a third membrane (e.g., center speaker). In one embodiment, the first and second membrane (e.g., outer speakers) are smaller than the third membrane (e.g., center speaker), and the voltage at the first and second membranes is adjusted to provide improved force cancellation at low frequencies and a linear quadrupole soundwave radiation pattern at high frequencies. This may further include, when the audio system 200 is outputting bass frequencies in a bass mode, providing a less amplified signal to one of the voice coils of speaker module 210 relative to the other voice coils. As such, greater bass performance can be achieved by lowering amplification power, while privacy can still be maintained in operating scenarios where bass frequency performance is not a priority.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

Figure 3A:
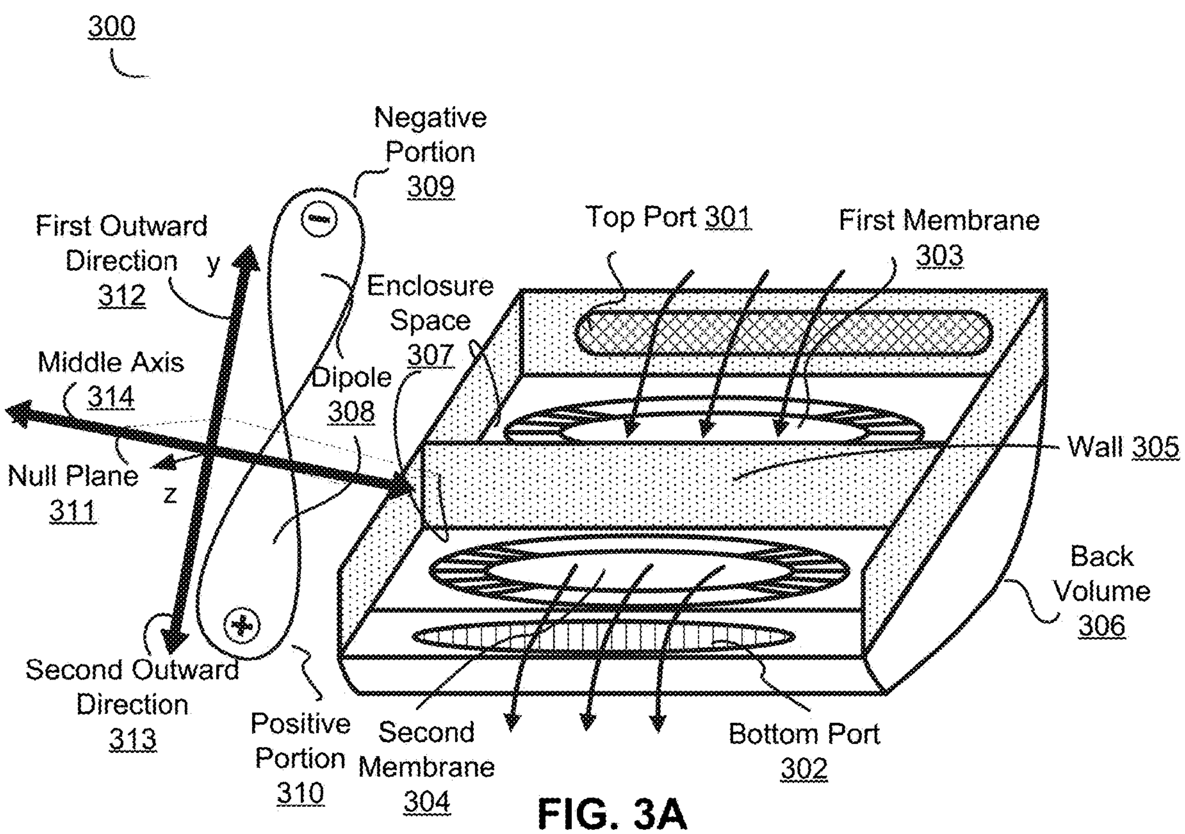
FIG. 3A is an illustrative diagram of a speaker module operating in a privacy mode, in accordance with one or more embodiments.

FIG. 3A is an illustrative diagram of a speaker module operating in a privacy mode, in accordance with one or more embodiments. Illustrated in FIG. 3A is a speaker module 300, which may be speaker module 210. FIG. 3A illustrates the speaker module 300 in an isometric view, with the y-axis pointing in the direction of the top and bottom of the speaker module 300, the x-axis running along the horizontal length of the enclosure, and the z-axis coming out of the page, pointing in the outward direction (e.g., outward towards the environment external to the speaker module). The speaker module includes a top port 301, a bottom port 302, a first membrane 303, a second membrane 304, a wall 305, a back volume 306, and an enclosure space 307. For the purposes of clarity in describing the invention, the description of FIG. 3A is provided with the respect to an embodiment where the speaker module 300 is integrated into a wearable headset.

The top port 301 provides audio output in the first outward direction 312. The top port 301 may be configured to provide sound waves produced by first membrane 303, radiating from within the enclosure space 307 and outwards towards an car of a wearer.

The bottom port 302 provides audio output in the second outward direction 313. The bottom port 302 may be configured to provide sound waves produced by second membrane 304, radiating from within the enclosure space 307 and outwards towards the car of a wearer.

The first membrane 303 generates sound waves through motion. Specifically, the first membrane 303 is configured to create a pressure wave that radiates through a medium (e.g., air) by vibrating back and forth in a linear direction.

The second membrane 304 generates sound waves through motion in the same manner as the first membrane 303. The illustration in FIG. 3A illustrates a moment in time when the first membrane 303 is in a negative phase and the second membrane 304 is in a positive phase. That is, the first membrane 303 is moving out of the enclosure space 307 and into the back volume 306, while the second membrane 304 is moving into the enclosure space 308 and out of the back volume 306. The first membrane 301 and second membrane 303 oscillate back and forth, switching from positive phase to negative phase over time, and according to a waveform that is provided as an electrical driving signal to each membrane (via voice coils wired to each membrane).

The first outward direction 312 and second outward direction 313 are substantially opposite directions relative to the headset enclosure (opposite "y-directions"). The top port 301 and bottom port 302 are spaced across opposite ends of the speaker module, along an axis of the first outward direction 312 and second outward direction 313 ("y-axis"). As the first membrane 303 and second membrane 304 move in opposite directions when provided the same input signal, the sound radiating in the first outward direction 312 and second outward direction 313 form a negative portion 309 and positive portion 310 of a dipole 308. As such, a null plane 311 is created along a middle axis 314 when audio output between the first port and the second port is matched.

First membrane 303 is situated near the top port 301 and separated by wall 305 from the second membrane 304, which is situated near the bottom port 302. A first surface of each membrane is exposed to the enclosure space 307 where the top port 301 and bottom port 302 are disposed, while the other surface of each membrane is exposed to a shared back volume 306. As the first and second membrane are being driven to produce sound, the second membrane 304 moves into the enclosure space 307 while the first membrane 303 moves into the shared back volume 306. And, as the second membrane 304 moves back into the shared back volume 306 the first membrane 303 moves back into the enclosure space 307. Thus, the pressure within the shared back volume is constantly maintained (i.e., isobaric) as the first membrane and second membrane are being driven, thereby resulting in a force-cancelling system. In one embodiment, the opposing linear motion of the membranes may be achieved by reverse wiring one of the voice coils, such that when the same input signal is provided to the each of the voice coils, the membrane that is reverse-wired moves in the opposite direction relative to the other membranes.

A dipole sound wave radiation pattern 308 is created as the first membrane 303 and second membrane 304 are driven at equal power output and opposing phase (i.e., opposite linear directions). As illustrated in FIG. 3A is an instant in time when the radiation in the first outward direction 312 forms the negative portion 309 of the dipole 308, while the radiation in the second outward direction 313 form the positive portion 310, though the phases of each portion flips as the first membrane 303 and second membrane 304 move in and out of the back volume 306 and the enclosure space 307. In the instance shown, the first membrane 303 moves into the shared back volume 306, and the audio output from the top port 301 forms the negative portion 309 of the dipole sound wave radiation pattern 308. Simultaneously, the second membrane 304 moves into the enclosure space 307, and the audio output from the bottom port 302 forms the positive portion 310 of the dipole sound wave radiation pattern 308. The negative portion 309 and positive portion 310 are wavefronts that are essentially identical monopole sources relative to the null plane 311 (i.e., equal strength, with opposite phase), which results in matched audio between the top port 301 and bottom port 302. The absence of audio across the null plane 311, results in reduced audio leakage or a lack of perception of sound from areas where the top port 301 and bottom port 302 are not directing audio, such as outward from the middle of the enclosure space. Therefore, leakage of sounds to unwanted areas of an environment (e.g., external to the wearer of a headset) can easily be reduced and privacy is maintained.

Figure 3B:
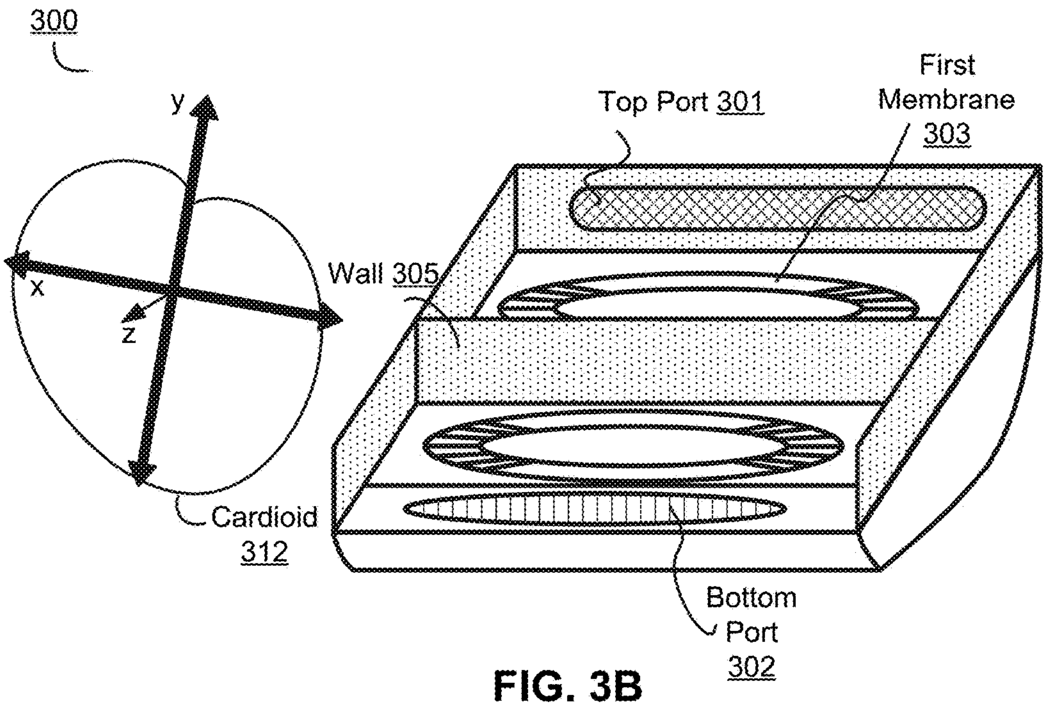
FIG. 3B is an illustrative diagram of a speaker module operating in a bass mode, in accordance with one or more embodiments.

FIG. 3B is an illustrative diagram of a speaker module, operating in a bass mode, in accordance with one or more embodiments. When operating in the bass mode, a bass frequency threshold is reached, and the power driven to the first membrane 303 is reduced relative to the power driven to the second membrane 302. For example, the first membrane 303 and second membrane 302 may each be connected to an individual amplifier, where an audio controller of the audio system can adjust the power level at each amplifier to control the strength of audio output. The reduction in power driven to the first membrane results in a lower output at the top port 301, thereby resulting in less bass frequency cancellation. With less bass frequency cancellation, a cardioid radiation pattern is formed, in which audio output propagates as a cardioid radiation pattern from the bottom port 302 with greater bass frequency response, while the null portion is reduced and shifted behind the cardioid, towards the top port 301. Therefore, in instances where audio leakage may not be as prioritized, a reduction in overall power can be performed to achieve greater bass frequency response by the audio system.

Figure 3C:
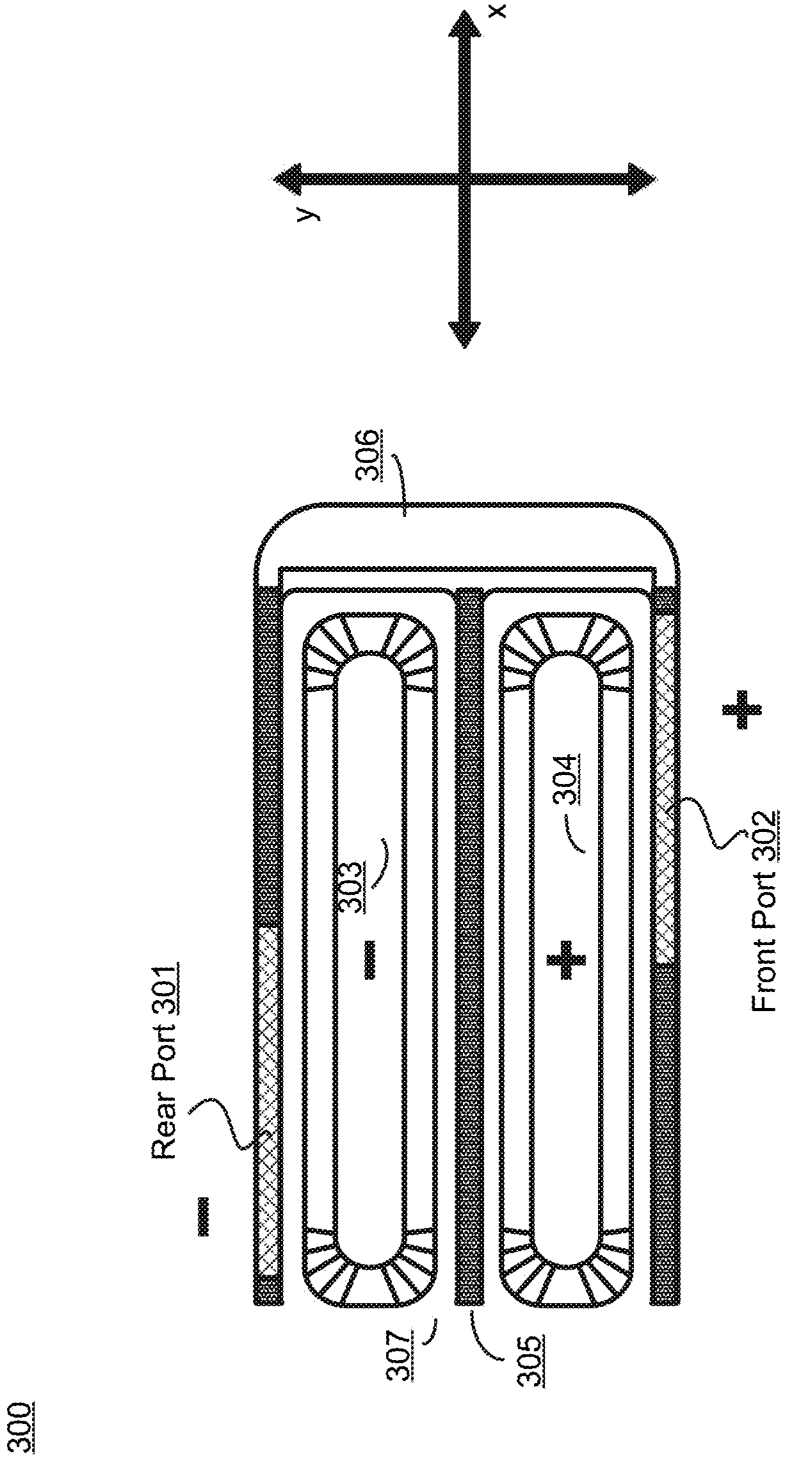
FIG. 3C is an illustrative diagram of locations of front and rear positions of bottom and top ports of a speaker module respectively, in accordance with one or more embodiments.

FIG. 3C is an illustrative diagram of locations of front and rear positions of bottom and top ports of a speaker module respectively, in accordance with one or more embodiments. In an embodiment, a speaker module as illustrated in FIG. 3C is the speaker module of FIGS. 3A and 3B. The illustrative diagram portrays the positioning of the ports from the perspective of a "top view," where the y-axis is the top, the x-axis is the horizontal length of the enclosure, and the z-axis coming out of the page is the outward direction towards the outside environment. In an embodiment where the enclosure is a frame of wearable glasses (e.g., frame 110 of FIG. 1), the speaker module 300 may sit above and near the cars of the wearer (e.g., just behind the cars). The enclosure space 307 comprises ports for providing sound to the wearer. As illustrated from left to right are the rear port 301 and front port 302 which correspond to the top and bottom ports of FIGS. 3A and 3B respectively. A wall 305 separates the first membrane 303 situated near the rear port 301 from the second membrane 304 situated near the front port 302. As such, audio produced by the first membrane 303 is output through the rear port 301 and audio produced by the second membrane 304 is output through the front port 302. As the second membrane is driven into the enclosure space 307 to produce sound, the first membrane is driven out of the enclosure space 307 into a shared back volume 306. In one embodiment, speaker module 300 comprises a lid that seals the enclosure space 307. For example, the front port 302 may be isolated internally from rear port 301 by the wall 305 and the lid of enclosure space 307. In such an embodiment, all the acoustic output directed outward from the front of first membrane 303 and front of second membrane 304 may be directed out of the enclosure space 307 through the rear port 301 and front port 302 respectively.

Figure 4:
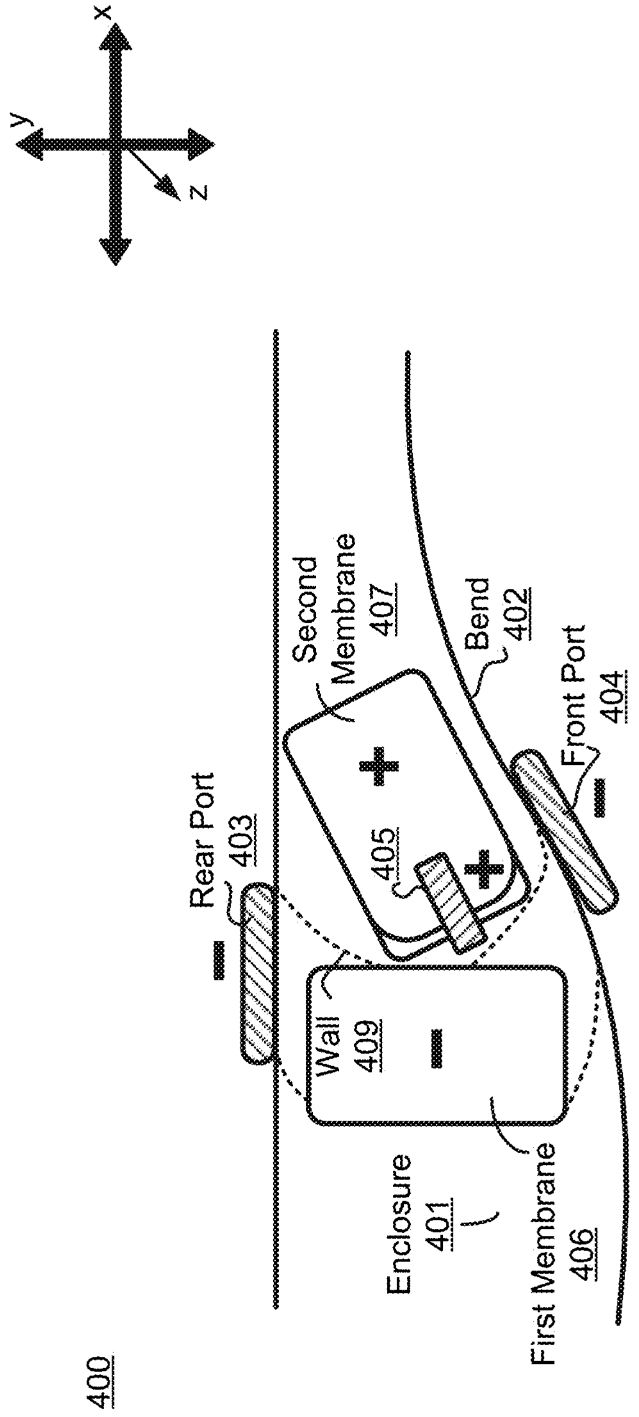
FIG. 4 is an illustrative diagram of a two speaker, three port configuration of a speaker module, in accordance with one or more embodiments.

FIG. 4 is an illustrative diagram of a two speaker (two membrane), three port configuration of a speaker module in accordance with one or more embodiments. For clarity of disclosure, the speaker module 400 is described with respect to an embodiment where the speaker module 400 is integrated into a wearable device, such as headset 100. As shown, the illustration of FIG. 4 is a side view of a portion of a frame of the headset, where left to right is rear (pointing away from the front display element of the headset) and front (pointing towards the front display element) respectively.

The first membrane and second membrane situated side-by-side in the enclosure 401. The enclosure 401 may be a frame of the wearable headset, such as frame 110. The enclosure 401 comprises a bend 402. For example, the bend 402 may be a portion of the enclosure 401 that wraps around the cars of the wearer, such that the enclosure 401 sits snugly on the cars. The front port 404 is situated at the bottom of the enclosure 404 (e.g., bottom edge of the frame) and directs audio output directly towards the wearer's ears. The rear port 403 is situated at the top of the enclosure 401 (e.g., top edge of the frame) and directs audio output towards the wearer in a direction that is away from the cars but may still be audible to the wearer. The center port 405 is situated in the middle portion of the enclosure 401 (e.g., along the side of the frame on an inner surface towards the wearer) and directs audio output directly towards the wearer, so as to be audible by the wearer's ears. In one embodiment, the center port 405 is situated along the side of the frame on an outer surface towards the environment and away from the wearer.

The first membrane 406 providing audio output through the front port 404 and rear port 403 is separated from the second membrane 407 by a wall 409. The second membrane 407 is situated near the center port 405 and provides audio output through the center port 405. The wall 405 prevents the audio output of the first membrane 406 from leaking out of the center port 405 and prevents audio output of the second membrane 407 from leaking out of the front port 404 and rear port 403.

When the speaker module 400 is operating in a bass mode, to create a mismatch between the center port and the front and rear ports at bass frequencies, the audio controller 150 may drive the first membrane 406 at a first power output and drive the second membrane 407 at a second power output that is different from the first. The difference between the first power output and the second power output may be achieved by decreasing power at an amplifier of the first membrane. This may create a monopole-like sound wave radiation pattern that is centered around the center port 405. When the speaker module 400 is operating in a privacy mode where the audio output is matched between the front, rear, and center ports, a linear quadrupole sound wave radiation pattern is generated, where audio output behind the center port (e.g., on the outer surface of the frame, pointing away from the wearer) is close to null. In embodiments, by creating an audio source at the center port 405 that has twice the source strength of the outer two audio sources from rear port 403 and front port 404, a linear quadrupole can be generated. The center port 405 may have twice source strength or volume velocity compared to the outer two ports, rear port 403 and front port 404, to create the linear quadrupole. In one embodiment, the two-speaker, three-port configuration comprises a single amplifier connected to both first membrane 406 and second membrane 407, and which may drive both the first membrane 406 and second membrane 407 at a matched output to form a linear quadrupole sound wave radiation pattern.

Figures 5A, 5B:
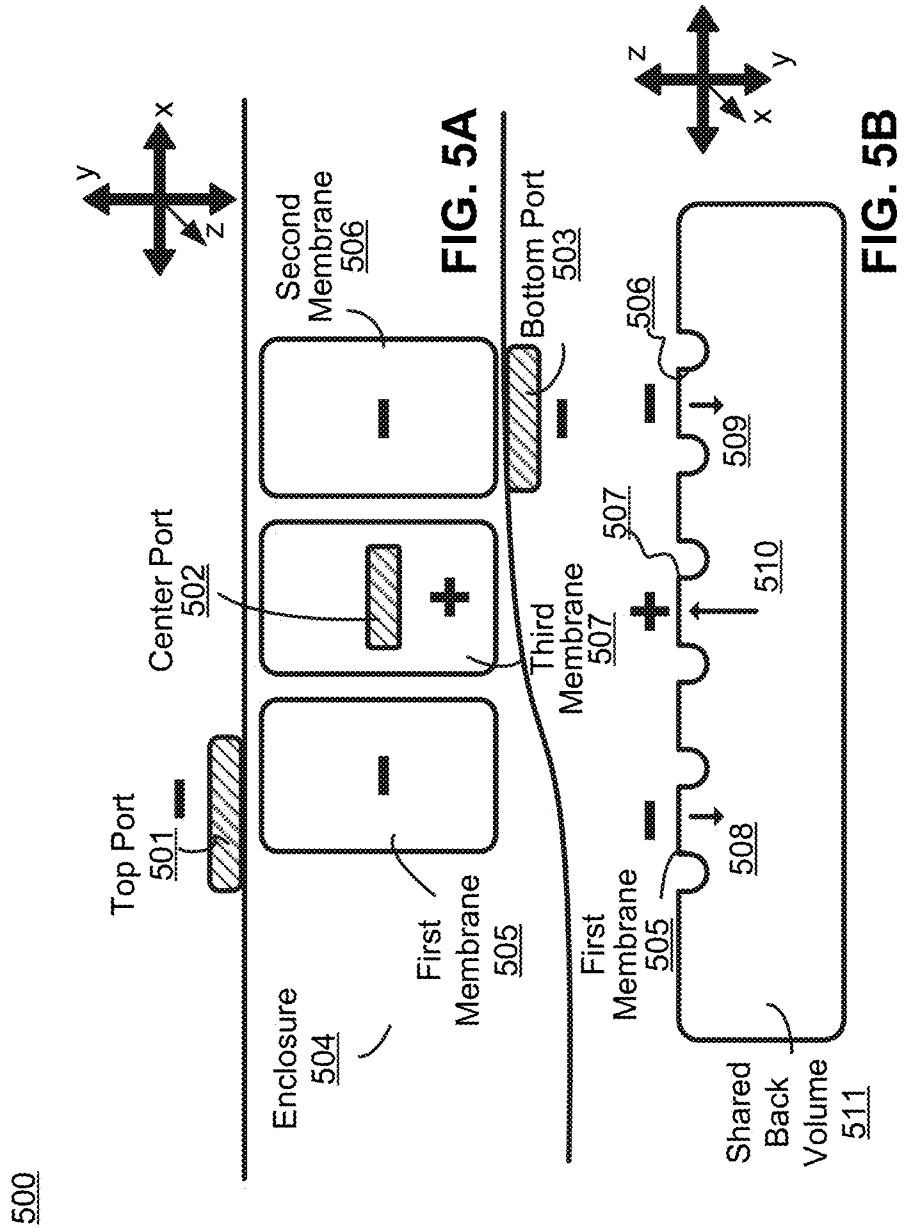
FIG. 5A is an illustrative diagram of a three speaker, three port configuration of a speaker module, in accordance with one or more embodiments.
FIG. 5B is a conceptual diagram of a speaker module in accordance with one or more embodiments.

FIG. 5A is an illustrative diagram of a three speaker (three membrane), three port configuration of a speaker module, in accordance with one or more embodiments. The first membrane 505, second membrane 506, and third membrane 507 of the speaker module 500 are arranged side-by-side-by-side in a coaxial arrangement along an axis of the enclosure 504. The top port 501, bottom port 503, and center port 502 are disposed along the enclosure 504 near the first membrane 505, second membrane 506, and third membrane 507 respectively.

When the speaker module 500 is operating in a bass mode and when producing bass frequencies, to create the mismatch in audio output between the center port 502 and the top 501 and bottom port 503, the first membrane 505 and the second membrane 506 are driven at a first power output and the third membrane 507 is driven at a second power output different from the first. The difference between the first power output and the second power output results in the mismatch in audio output between the center port 502 and the top 501 and bottom port 503. In some embodiments, the difference between the first power output and the second power output may be achieved by decreasing power at an amplifier of the first membrane 505 or by decreasing power at an amplifier of the second membrane 506. During the mismatch, a cardioid radiation pattern centered around the center port 502 is formed.

FIG. 5B is a conceptual diagram of a force-cancelling, isobaric speaker module in accordance with one or more embodiments. The conceptual diagram shown is illustrative of the three speaker (three membrane), three port configuration shown in FIG. 5A. As the first membrane 505 and the second membrane 506 move into the shared back volume 511, the third membrane 507 moves into the enclosure 504. To maintain constant pressure, the displacements 508 and 509 of the first membrane 505 and second membrane 506 moving out of the enclosure 504 and into the shared back volume 511 are each equal to about half of the displacement 510 of the third membrane 507, which is moving out of the shared back volume 511 and into the enclosure 504. As such, the total displacement in either direction (into or out of the shared back volume 511) is zero at any given time, and the isobaric process and force cancellation are maintained.

A match in combined power output of the first membrane 505 and the second membrane 506 (e.g., each ½ of the power of the third membrane) with the power output of the third membrane results in the match in audio output between the center port and the top and bottom ports. In one embodiment, the size of first membrane 505, second membrane 506, and third membrane 507 may be substantially the same, and power output may be matched at all three ports. To achieve ideal force cancellation and a linear quadrupole soundwave radiation pattern, the first membrane 505 and second membrane 506 may be configured to output audio at half of the power of the third membrane 507. In one embodiment, the first membrane 505 and second membrane 506 are smaller than the third membrane 507, and the voltage at the first membrane 505 and second membrane 506 provides improved force cancellation at low frequencies, with linear quadrupole soundwave radiation patterns emitted at high frequencies. In such an embodiment, the top port 501 and bottom port 503 may have about half of the acoustic source strength or volume velocity compared to the center port 502.

Figure 6:
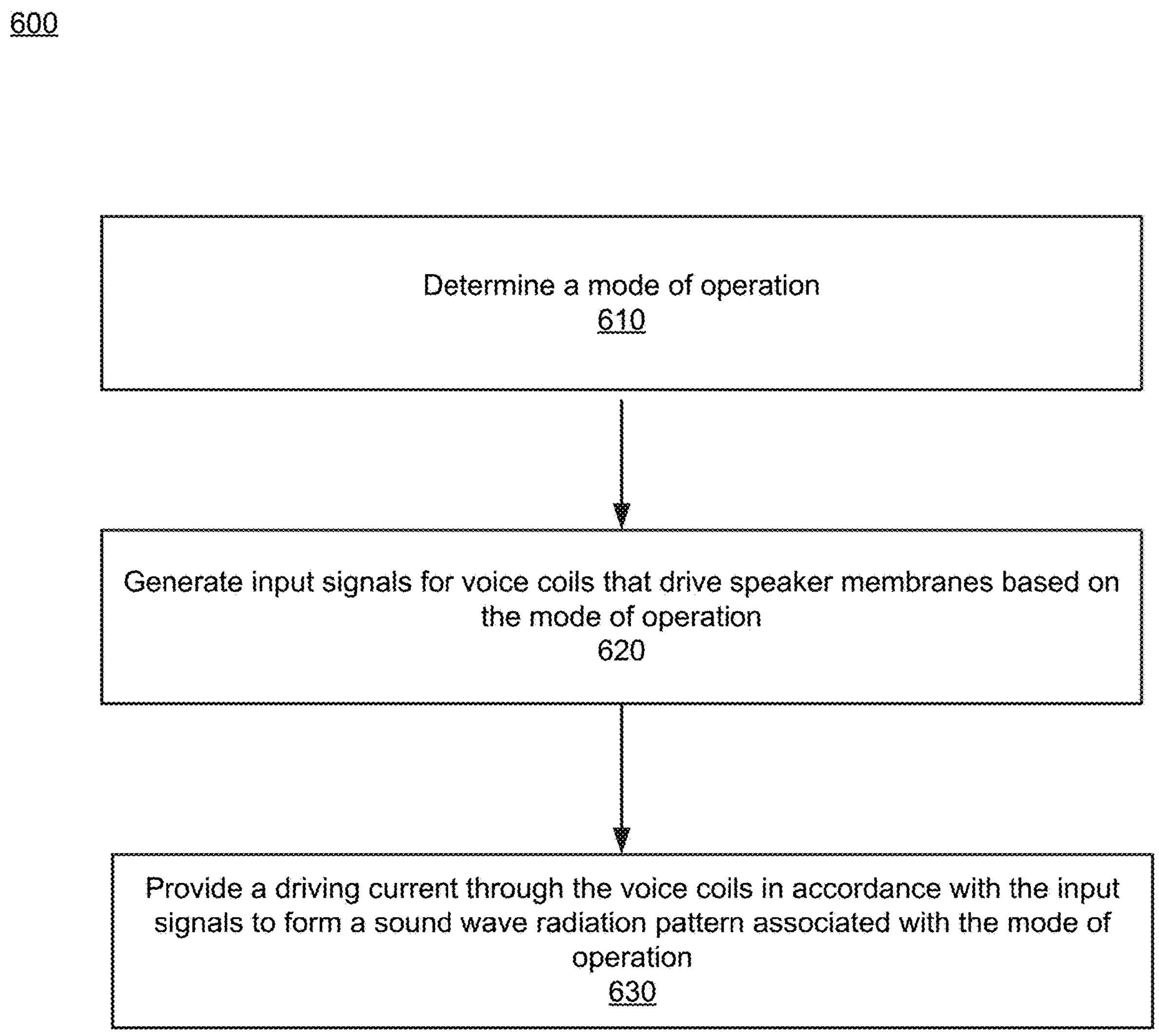
FIG. 6 is a flowchart illustrating a process for providing audio output, in accordance with one or more embodiments.

FIG. 6 is a flowchart illustrating a process for providing audio output, in accordance with one or more embodiments. A process 600 shown in FIG. 6 may be performed by components of an audio system (e.g., audio system 200). Specifically, process 600 may be executed by a processor of a controller of the audio system (e.g., audio controller 230). Other entities may perform some or all of the steps in FIG. 6 in other embodiments. Embodiments may include different and/or additional steps, or perform the steps in different orders.

The controller determines 610 a mode of operation. The mode of operation could be determined based on a user setting/preference, a user selection, or based on the type of audio that is output or the type of application that is executing the audio. For example, the mode of operation may be based on a user preference or selection for a bass mode or privacy mode. Determining the mode of operation based on the type of audio that is output may include determining that the audio system is outputting voice call audio and should operate in a privacy mode, or, determining that the audio system is outputting audio for media or game content and should operate in a bass mode. Determining the mode of operation based on the type of application that is executing the audio may include determining that the audio system is playing audio from a voice call application and should operate in a privacy mode, or, determining that the audio system playing audio from a media playback or game execution application and should operate in a bass mode.

The controller generates 620 input signals for the voice coils that drive the speaker membranes based on the mode of operation. Depending on the particular mode of operation, different input signal may be generated for each voice coil driving a particular membrane. In an embodiment where the opposing linear motion of the membranes and opposing phase of the radiation pattern are accomplished by reversing a speaker's polarity relative to the audio system (e.g., reverse wiring one of the voice coils), the input signals provided to each of the voice coils may be the same across all frequencies when operating in a privacy mode. And, when operating in a bass mode, the input signals generated for one of the voice coils may be reduced relative to the other voice coils for bass frequencies by providing a less amplified signal (i.e., lower-powered amplification). In an embodiment where the opposing linear motion is accomplished through modifying the input signal itself, when operating in a privacy mode, the waveforms of the input signals that are generated for each of the voice coils may be shifted relative to one another by 180 degrees.

The controller provides 630 a driving current though the voice coils in accordance with the input signals to form a sound wave radiation pattern associated with the mode of operation. Driving the voice coils in accordance with the input signals may include matching the output between ports of the audio system across all frequencies when operating in a privacy mode input. Driving the voice coils in accordance with the input signals may also include matching the output between ports of the audio system for high frequencies (e.g., frequencies above a predefined threshold set for the mode) and mismatching the output between the ports for bass frequencies (e.g., frequencies at or below the predefined threshold set for the mode). The membranes generate sound that is output from the ports to form sound wave radiation patterns that are associated with different modes of operation. For example, in a privacy mode or when operating above the bass threshold of a particular mode, the sound wave radiation pattern may be a dipole or linear quadrupole pattern, Meanwhile, when operating at or below the bass threshold of the particular mode, the sound wave radiation pattern may be a monopole-like or cardioid pattern. When operating in the bass mode, for frequencies above the predefined bass threshold for the mode, the controller may provide equally amplified signals to the voice coils. For frequencies at or below the predefined bass threshold, the controller may provide a less amplified signal to at least one of the voice coils relative to the other voice coils. In one embodiment, the output at each of the speaker membranes are matched. In one embodiment, in a two membrane (two speaker), two-port dipole design, both membranes are driven by a single amplifier. This may result in force cancellation, ideal port matching for improved dipole performance, and the benefits of the isobaric shared back volume.

Figure 7:
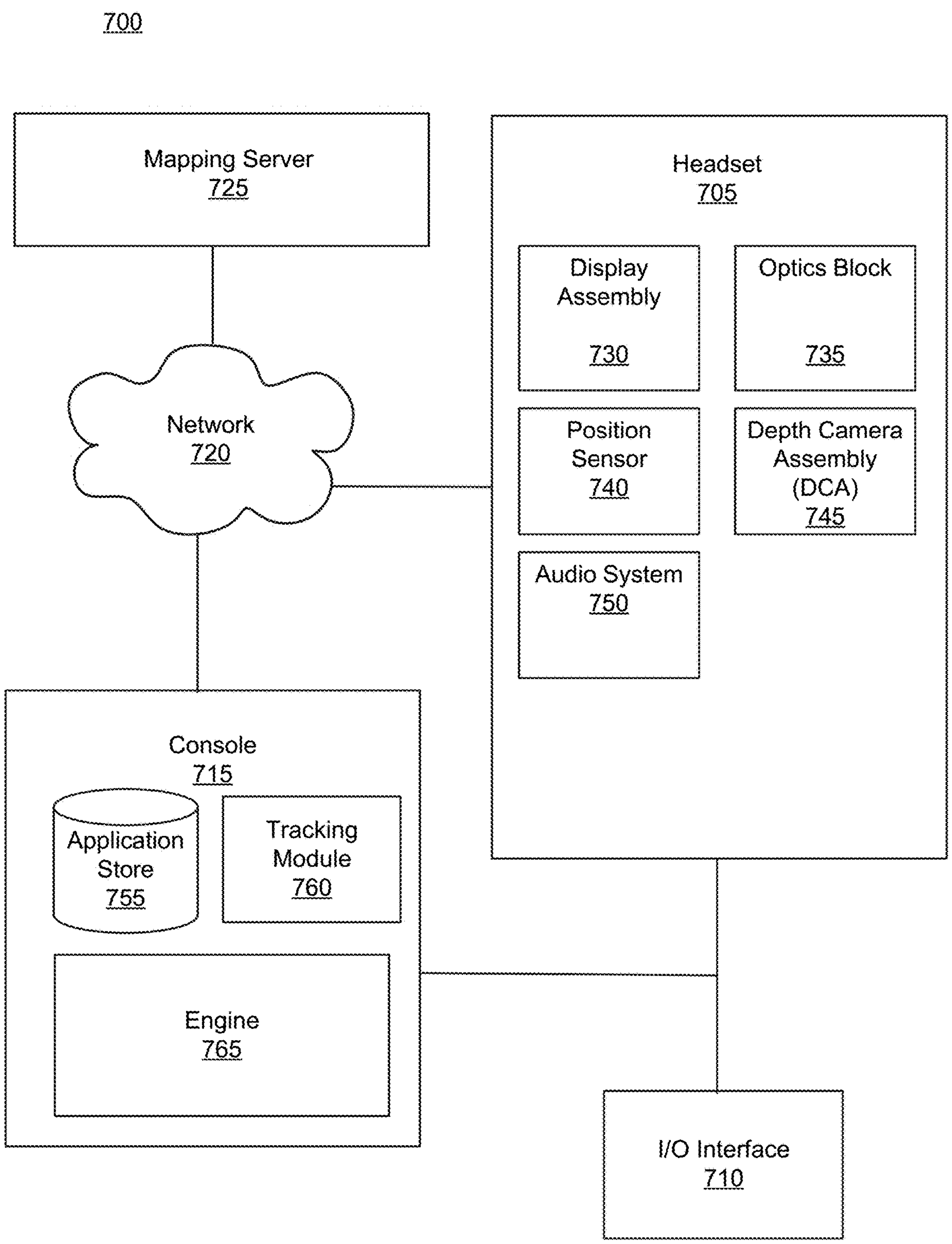
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1.

The audio system 750 provides audio content to a user of the headset 705. The audio system 750 is substantially the same as the audio system 200 describe above. The audio system 750 may comprise one or acoustic sensors, one or more speakers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

A controller of the audio system 750 includes a non-transitory computer-readable medium (e.g., a memory device) and one or more processors. The non-transitory computer-readable storage medium stores instructions. The instructions, when executed by a processor of a device, cause the device to determine a first mode of operation, generate first mode input signals for voice coils that drive a plurality of membranes based in part on the determined first mode of operation, and provide a driving current the voice coils in accordance with the first mode input signals. As such, the plurality of membranes generates sound that is output from a plurality of ports to form a first sound wave radiation pattern of a plurality of predetermined sound wave radiation patterns that are associated with different modes of operation of the audio system 750.

Embodiments described herein provide several technical advantages. The isobaric configuration described reduced complexity for achieving dipole patterns, eliminating the need for routing of ports in front of, or on the side of, speakers. The configuration reduces sealing complexity and may only require one external port per speaker/membrane and reduces the risk of water intrusion from behind a membrane. The isobaric configuration acts like an infinite baffle and minimizes the stiffness associated with a small, closed back volume or the sensitivity loss associated with the acoustic mass in a rear acoustic waveguide. Embodiments provide improved matching between the front and rear ports, resulting in improved dipole behavior and privacy performance. Furthermore, increased bass output can be uniquely achieved by reducing overall power output rather than by increasing power. Tunable polar patterns enable different tuning modes that prioritize bass performance (e.g., gaming mode) or privacy performance (e.g., phone calls). This enables the ability to reduce force cancellation in exchange for increased low frequency output by reducing the input power to a speaker membrane. Cardioid shading at low frequencies through mismatching between ports improves bass performance, while ideal matching between ports reduces audio leakage at high frequencies by creating substantially null planes, such as in the case of a dipole polar pattern for a two-port configuration or a linear quadrupole pattern for a three port configuration.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Figure 8:
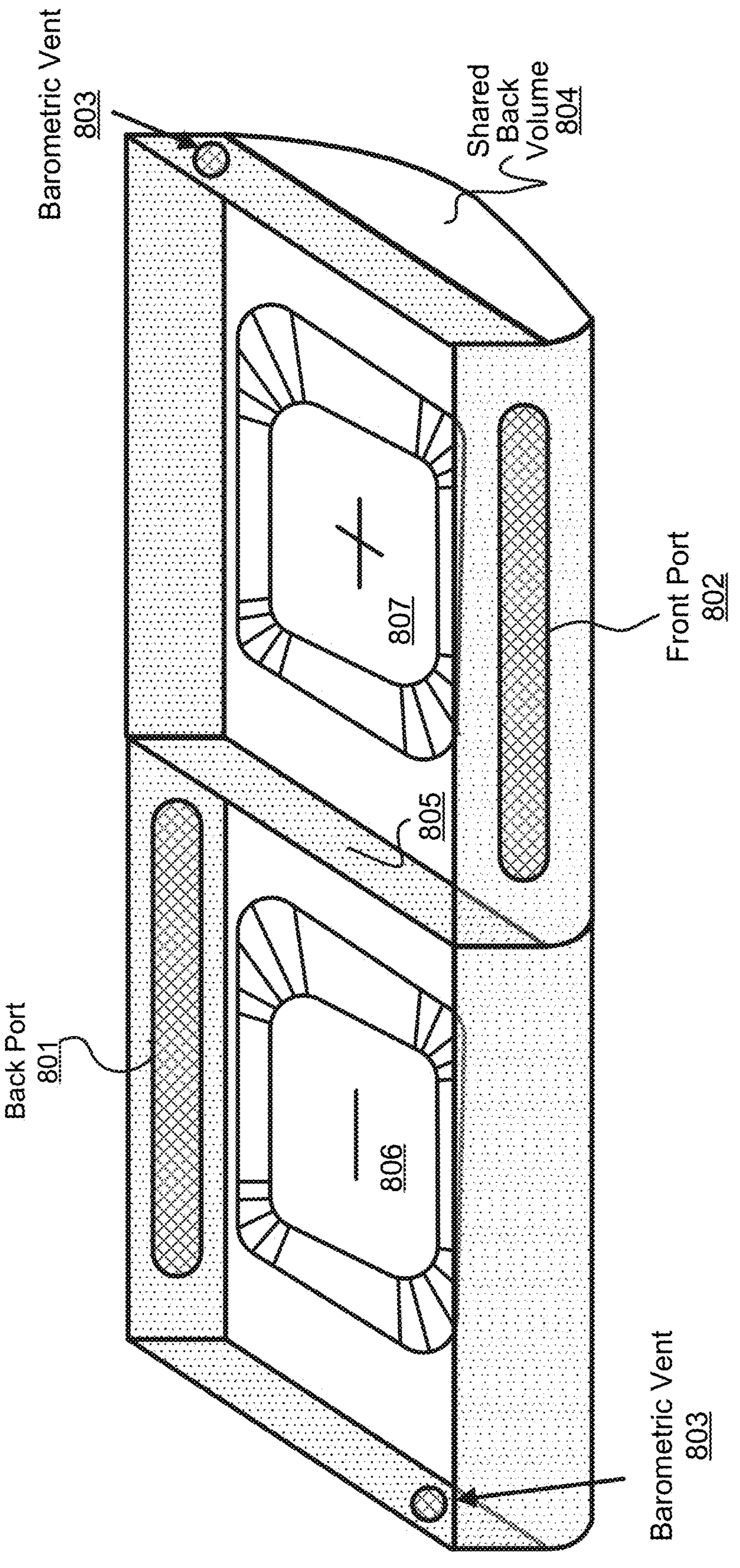
FIG. 8 is an illustrative diagram of another two speaker, two port configuration of a speaker module, in accordance with one or more embodiments.

FIG. 8 is an illustrative diagram of another two speaker, two port configuration of a speaker module, in accordance with one or more embodiments. Speaker module 800 comprises a first membrane 806 and a second membrane 807. The first membrane 806 is situated adjacent to the second membrane 807, sharing a shared back volume 804 that is isobaric, while the first membrane 806 and second membrane 807 are separated from one another in the enclosure space by a wall 805. A back port 801 is situated at the enclosure space near the first membrane 806, while a front port 802 is situated at the enclosure space near the second membrane 807. Barometric vents 803 for each of the first membrane 806 and the second membrane 807 are situated at the enclosure space near each membrane to vent additional excess pressure from out of the enclosure space.

Figure 9:
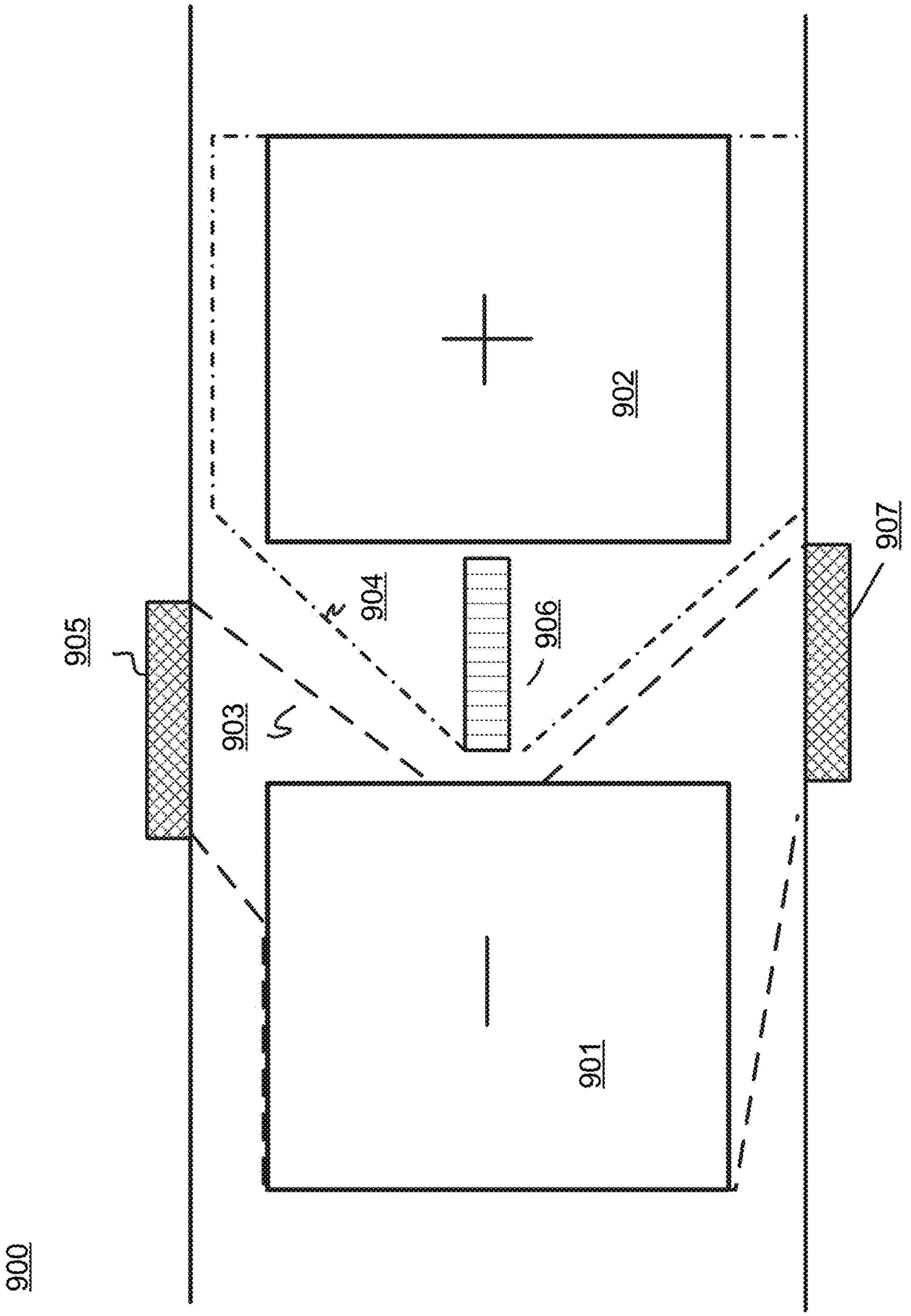
FIG. 9 is an illustrative diagram of another two speaker, three port configuration of a speaker module, in accordance with one or more embodiments.

FIG. 9 is an illustrative diagram of another two speaker, three port configuration of a speaker module, in accordance with one or more embodiments. Speaker module 900 comprises a first membrane 901 and a second membrane 902. The first membrane 901 is enclosed by a first wall 903, and the second membrane 902 is enclosed by a second wall 904.

A top port 905 and a bottom port 907 are situated at the enclosure space of the first membrane. A center port 906 is situated at the enclosure space of the second membrane.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

determining a first mode of operation of an audio device;

generating, based at least in part on the determined first mode of operation, first mode input signals for voice coils that drive a plurality of membranes of the audio device, a first surface of each of the plurality of membranes being part of a shared back volume within an enclosure, a second surface of each of the plurality of membranes being part of a front volume within the enclosure that includes a plurality of ports, and pressure within the shared back volume being substantially isobaric; and providing a driving current through the voice coils in accordance with the first mode input signals, such that the plurality of membranes generates sound that is output from the plurality of ports to form a first sound wave radiation pattern of a plurality of predetermined sound wave radiation patterns that are associated with different modes of operation.

2. The method of claim 1, wherein providing the driving current through the voice coils in accordance with the first mode input signals comprises providing equally amplified signals to the voice coils.

3. The method of claim 1, wherein the first sound wave radiation pattern is a substantially dipole sound wave radiation pattern.

4. The method of claim 1, wherein the first sound wave radiation pattern is a substantially linear quadrupole sound wave radiation pattern.

5. The method of claim 1, wherein providing the driving current through the voice coils in accordance with the first mode input signals causes the plurality of membranes to generate pressure waves of equal amplitude and opposite phase.

6. The method of claim 1, wherein determining the first mode of operation includes determining the first mode of operation for frequencies above a threshold frequency.

7. The method of claim 1, wherein the first mode of operation includes a privacy mode.

8. The method of claim 7, wherein the privacy mode is a call mode.

9. The method of claim 1, further comprising:

determining a second mode of operation of the audio device;

generating, based at least in part on the determined second mode of operation, second mode input signals for the voice coils that drive the plurality of membranes; and providing a driving current through the voice coils in accordance with the second mode input signals, such that the plurality of membranes generates sound that is output from the plurality of ports to form a second sound wave radiation pattern of a plurality of predetermined sound wave radiation patterns that are associated with different modes of operation.

10. The method of claim 9, wherein the second sound wave radiation pattern comprises a substantially monopole sound wave radiation pattern.

11. The method of claim 9, wherein the second sound wave radiation pattern comprises a substantially cardioid sound wave radiation pattern.

12. The method of claim 9, wherein the second mode of operation includes a game mode or a media playback mode.

13. The method of claim 9, wherein providing the driving current through the voice coils in accordance with the second mode input signals comprises:

for frequencies above a predefined threshold, providing equally amplified signals to the voice coils; and for frequencies at or below the predefined threshold, providing a less amplified signal to at least one of the voice coils relative to the other voice coils.

14. The method of claim 13, wherein:

the second mode of operation includes a game mode, a movie mode, or a music mode; and the predefined threshold for the music mode is higher than the predefined threshold for the game mode or the movie mode.

15. One or more non-transitory computer-readable storage media comprising instructions stored thereon, the instructions, when executed by one or more processors of a device, causing the device to:

determine a first mode of operation of the device;

generate, based at least in part on the determined first mode of operation, first mode input signals for voice coils that drive a plurality of membranes of the device, a first surface of each of the plurality of membranes being part of a shared back volume within an enclosure, a second surface of each of the plurality of membranes being part of a front volume within the enclosure that includes a plurality of ports, and pressure within the shared back volume being substantially isobaric; and provide a driving current through the voice coils in accordance with the first mode input signals, such that the plurality of membranes generates sound that is output from the plurality of ports to form a first sound wave radiation pattern of a plurality of predetermined sound wave radiation patterns that are associated with different modes of operation.

16. The one or more non-transitory computer-readable storage media of claim 15, wherein providing the driving current through the voice coils in accordance with the first mode input signals comprises providing equally amplified signals to the voice coils.

17. The one or more non-transitory computer-readable storage media of claim 15, wherein the first sound wave radiation pattern is a substantially dipole sound wave radiation pattern or a substantially linear quadrupole sound wave radiation pattern.

18. The one or more non-transitory computer-readable storage media of claim 15, wherein the instructions, when executed by the one or more processors of the device, further cause the device to:

determine a second mode of operation of the device;

generate, based at least in part on the determined second mode of operation, second mode input signals for the voice coils that drive the plurality of membranes; and provide a driving current through the voice coils in accordance with the second mode input signals, such that the plurality of membranes generates sound that is output from the plurality of ports to form a second sound wave radiation pattern of a plurality of predetermined sound wave radiation patterns that are associated with different modes of operation.

19. The one or more non-transitory computer-readable storage media of claim 18, wherein the second sound wave radiation pattern comprises a substantially monopole sound wave radiation pattern or a substantially cardioid sound wave radiation pattern.

20. The one or more non-transitory computer-readable storage media of claim 18, wherein providing the driving current through the voice coils in accordance with the second mode input signals comprises:

for frequencies above a predefined threshold, providing equally amplified signals to the voice coils; and for frequencies at or below the predefined threshold, providing a less amplified signal to at least one of the voice coils relative to the other voice coils.

* * * * *